May 24, 1949. H. B. SCHOLTEN 2,470,870
COUPLING OF THE BALL AND SOCKET TYPE
Filed Oct. 8, 1947
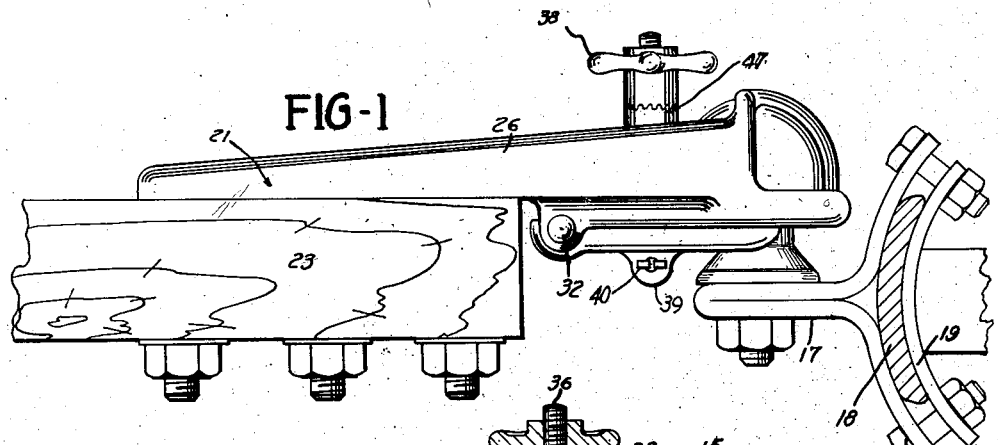
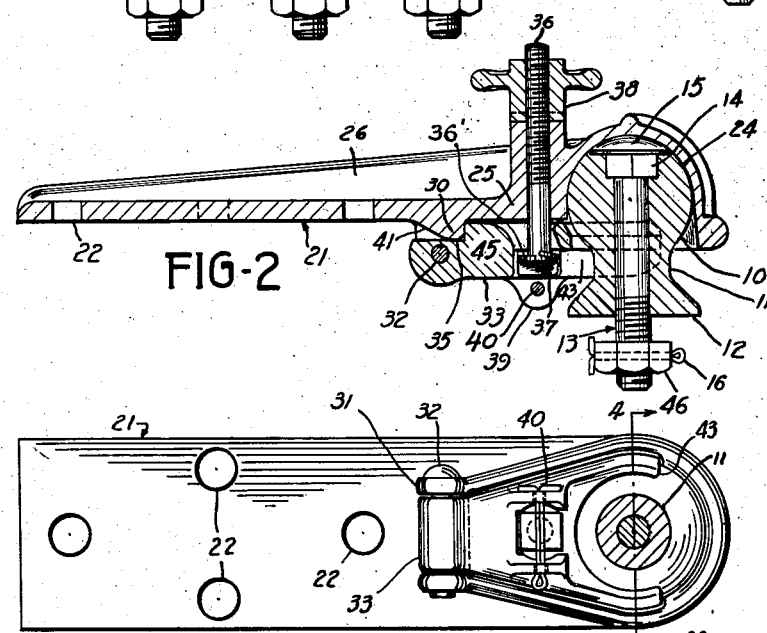
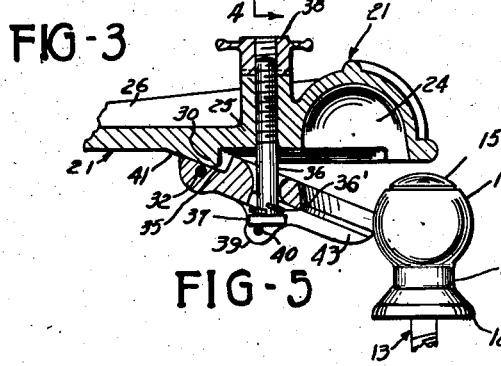
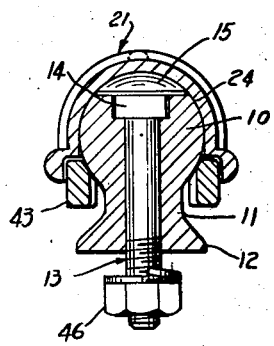
INVENTOR.
HARLEY B. SCHOLTEN
BY
Wheeler, Wheeler & Wheeler
ATTORNEYS Patented May 24, 1949

2,470,870

UNITED STATES PATENT OFFICE 2,470,870

COUPLING OF THE BALL-AND-SOCKET TYPE

Harley B. Scholten, Sheboygan Falls, Wis.

Application October 8, 1947, Serial No. 778,701

7 Claims. (Cl. 287—89)

1

My invention relates to improvements in couplings of the ball and socket type, with particular reference to couplings for trailers to be connected with motor driven vehicles.

The object of my invention is to provide a more reliable and more conveniently manipulated coupling than any heretofore made.

More specifically, my objects are to provide a ball and socket coupling with a pivotal clamping jaw, which, when open, normally occupies a ball receiving position and is partially closed by the ball when moving into the socket—to provide a clamping jaw with a horizontal pivot pin and a vertically disposed actuating bolt having a conveniently accessible manually operable nut, which becomes automatically locked against accidental release when adjusted to hold the jaw in clamping position—to provide an assembly in which the pivot pin and actuating bolt are both located on the same side of the socket in the member with which they are associated—to provide the socketed member clamping jaw with means for holding them in ball receiving position when open, and to provide means for relieving the pivot pin and jaw actuating bolt from strain and vibratory shock when the jaw is in ball engaging position.

A further object is to provide a coupling, which, when used to connect a trailer to a motor driven vehicle, cannot be broken or released under the conditions of road travel to which trailers are subjected.

In the drawings:

Figure 1 is a side elevation of my improved coupling as applied for the connection of a trailer tongue with the rear bumper of a motor driven vehicle.

Figure 2 is a detached vertical sectional view of the coupling, with the members interlocked.

Figure 3 is a bottom plan view of the same.

Figure 4 is a sectional view drawn to line 4—4 of Figure 3.

Figure 5 is a fragmentary view, in longitudinal section, showing the clamping jaw in open position and the ball detached.

Like parts are identified by the same reference characters throughout the several views.

The members of my improved coupling are preferably formed of bronze. A spherically rounded knob-like coupling member 10 is mounted on a short post 11 having a base flange 12. A vertical bolt receiving bore extends through these members to receive a connecting bolt 13 of the carriage bolt type having a threaded lower end, an upper end portion 14 which is squared in cross section, and a rounded head 15 which is counter-

2 sunk in the knob, with its upper surface conforming in curvature to that of the knob or ball 10. The squared portion of the bolt fits a corresponding portion of the bore and the threaded lower end is provided with a clamping nut 46, normally locked against release by a cotter pin 16 extending through a hole in the nut and bolt, as best shown in Figure 2. This bolt and nut may be used to clamp the supporting post 11 and flange 12 to any suitable support, such, for example, as the bracket 17 shown in Figure 1, as attached to a bumper bar 18 of a motor driven vehicle by a clamping plate 19 and bolts 20. Such supporting brackets are in common use and further illustration and description of the means for connecting a trailer coupling member to a motor driven vehicle is unnecessary.

The other member of my improved coupling comprises a plate 21 having a rear portion provided with apertures 22 whereby it may be bolted to a suitable portion, such as the tongue 23, of a trailer. The front end of the plate 21 has a spherically rounded socket 24, the concave under surface of which conforms to the rounded surface of the knob 10.

Between the socket 24 and the bolt receiving rear end portion, the plate 21 has a vertically apertured thick portion 25, in the rear of which marginal reenforcing side flanges 26 extend, preferably taperingly, from the thick portion of the rear end of the plate.

Also, rearwardly of the thick portion 25 the plate 21 has a depending transversely extending interlocking bar 30, which is preferably formed integrally with the plate and is provided with apertured ears 31 to receive a pivot pin 32 which connects the plate 21 to a clamping jaw 33, now to be described.

The shank portion of the clamping jaw has its upper surface notched at 35 to receive the interlocking bar 30. Its mid portion is apertured to receive a clamping bolt 36, the head 37 of which is countersunk in the under surface of the jaw. This bolt extends upwardly through the aperture in the thick portion 25 of the plate, and a manually operable clamping nut 38 is threaded to the upper end of the bolt. A resilient washer 36' on bolt 36 coacts with nut 38 in holding the bolt in a given position.

The under surface of the clamping jaw may be provided with ears 39 flanking the head of the bolt and apertured to receive and support a cotter pin 40 underneath the bolt head. However, this cotter pin may be unnecessary if the nut 38 has its under surface serrated and interlockingly engageable with the upper surface of the thickened portion of the plate, as shown at 47 in Figure 1.

When the nut 38 is partially unscrewed, the clamping jaw may be allowed to swing downwardly until the base of the notch 35 strikes the oblique rear face 41 of the bar 30, the latter thus serving as a stop to hold the clamping jaw from further downward movement. The forward end of this jaw has fork arms 43 provided with curved inner faces to fit the under surface of the ball or knob 10 when the jaw is in coupling position. When in releasing position, these fork arms straddle the post 11 and allow the ball and post to be withdrawn from the socket, as best indicated in Figure 5. The jaw will then be held by the oblique face 41 of the stop bar 30 in position to receive the post 11 when the parts are again assembled, whereupon the base flange 12 will push the fork arms upwardly toward their position of clamping engagement with the ball. Thereupon the nut 38 will be manually operated to pull the bolt 36 upwardly and swing the jaw to its clamping position.

In the clamping position the cross bar 30 engages the shoulder 45 at the front end of the notch in the clamping jaw and thus relieves the pivot pin 32 and the bolt 36 from shock and strain when the motion of the vehicle is suddenly checked and the momentum of the trailer tends to carry it forwardly against the other coupling member. This engagement of the bar 30 against the shoulder 45 also tends to relieve the jaw connecting pivot pin and bolt from vibrations incident to road travel, such as have heretofore caused rapid wear.

I claim:

1. A coupling of the ball and socket type, including the combination of an upstanding ball member, a socket member having a downwardly facing spherically rounded socket, a jaw having one end horizontally pivoted to the socket member and provided with fork arms adapted for engagement with the ball, a clamping bolt extending through the jaw and socket member between the socket and the pivotal jaw connection, with the headed end of the bolt in engagement with the jaw, a nut threaded on the upper end of the bolt above the socket member, and locking means for holding the bolt in jaw clamping position.

2. A coupling of the ball and socket type, including the combination of a knob-like ball having a supporting post, flanged at its lower end, a connecting bolt extending through the ball and post, and provided with a head countersunk in the ball with an outer surface corresponding in curvature with that of the ball, a coupling plate provided with a downwardly facing socket having a concave face corresponding in curvature with that of the ball, a clamping jaw pivoted to the under surface of the plate and provided with fork arms straddling said ball supporting post, an actuating bolt extending through the jaw and coupling plate between the fork arms and the pivotal connection of the jaw, a manually operable nut on the upper end of the bolt, and lock nut means for preventing vibration of the coupling from causing said nut to unscrew.

3. A coupling of the ball and socket type comprising an upstanding member having a post provided with a spherically rounded knob on its upper end, a socket member having a downwardly facing socket adapted to fit said knob, a clamping jaw pivoted to the under surface of the member and provided with ball engaging fork arms straddling said post, actuating bolt and nut means between said fork arms and the pivotal connection of the jaw, and means for limiting the opening movement of the jaw to a position for engaging and guiding the ball into its socket when the coupling members are brought together.

4. A coupling of the ball and socket type comprising an upstanding member having a post provided with a spherically rounded knob on its upper end, a socket member having a downwardly facing socket adapted to fit said knob, a clamping jaw pivoted to the under surface of the member and provided with ball engaging fork arms straddling said post, actuating bolt and nut means between said fork arms and the pivotal connection of the jaw, and means for limiting the opening movement of the jaw to a position for engaging and guiding the ball into its socket when the coupling members are brought together, said means comprising a bar on the under surface of the socket member having an oblique face in the rear of the jaw pivot, said jaw being recessed for engagement with the bar, with one wall of the recess movable into engagement with the oblique face of the bar when the jaw moves to open position.

5. In a coupling of the ball and socket type, the combination of a connecting plate having at one end a downwardly facing socket, a forked ball engaging jaw pivotally connected with the under surface of the plate with its fork arms movable toward and away from said socket, a jaw actuating bolt having its head socketed in the under surface of the jaw between the fork arms and the jaw pivot and extending upwardly through the jaw and plate, a manually operable nut threaded to the upper end of the bolt above the plate, and means for locking said nut and bolt against accidental release when the jaw is in ball engaging position.

6. In a coupling of the ball and socket type, a socket member having a forked ball engaging member pivotally connected with the socket member and provided with a recess in its upper surface, said socket member having a depending transversely disposed bar adapted to interlock in said recess when the jaw is in ball engaging position, whereby to relieve the pivotal connection from shock, vibration and strain.

7. In a coupling of the ball and socket type, a socket member having a ball engaging clamping jaw pivotally connected thereto, an actuating bolt connecting said jaw and socket member between the pivotal connection and the ball engaging portion of the jaw, and means for locking said bolt in jaw clamping position, together with means for interlocking the jaw and the socket member when in clamping position to relieve the bolt and pivotal connection from stresses transversely thereof.

HARLEY B. SCHOLTEN.

REFERENCES CITED

The following references are of record in the file of this patent:

UNITED STATES PATENTS

| Number | Name | Date |
|---|---|---|
| 683,049 | Johnston | Sept. 24, 1901 |
| 941,928 | Jourdain et al. | Nov. 30, 1909 |
| 1,449,034 | Calaway | Mar. 20, 1923 |